United States Patent
Kwon

(10) Patent No.: US 8,687,081 B2
(45) Date of Patent: Apr. 1, 2014

(54) METHOD AND APPARATUS FOR PROCESSING IMAGE BASED ON SCENE MODE DISPLAY

(75) Inventor: O-hyun Kwon, Suwon-si (KR)

(73) Assignee: Samsung Electrics Co., Ltd., Suwon-si (KR)

( * ) Notice: Subject to any disclaimer, the term of this patent is extended or adjusted under 35 U.S.C. 154(b) by 571 days.

(21) Appl. No.: 12/893,049

(22) Filed: Sep. 29, 2010

(65) Prior Publication Data

US 2011/0074971 A1   Mar. 31, 2011

(30) Foreign Application Priority Data

Sep. 29, 2009  (KR) .................. 10-2009-0092471

(51) Int. Cl.
 *H04N 5/228* (2006.01)
 *H04N 5/222* (2006.01)
(52) U.S. Cl.
 USPC ................................. 348/222.1; 348/333.01

(58) Field of Classification Search
 None
 See application file for complete search history.

(56) References Cited

U.S. PATENT DOCUMENTS

| | | | |
|---|---|---|---|
| 2004/0150850 A1* | 8/2004 | Hanamoto | 358/1.9 |
| 2007/0096024 A1* | 5/2007 | Furuya et al. | 250/332 |
| 2009/0073285 A1* | 3/2009 | Terashima | 348/231.99 |
| 2010/0020191 A1* | 1/2010 | Sugimoto | 348/222.1 |
| 2010/0194931 A1* | 8/2010 | Kawaguchi et al. | 348/240.99 |

* cited by examiner

*Primary Examiner* — Luong T Nguyen
(74) *Attorney, Agent, or Firm* — Drinker Biddle & Reath LLP

(57) ABSTRACT

A method and apparatus for processing an image based on a scene mode. An image processing apparatus is disclosed including a digital signal processor (DSP) configured to select scene modes applicable to a live-view image and configured to display the selected scene modes as icons on the live-view image. An image processing method is disclosed including selecting scene modes applicable to a live-view image; and displaying the selected scene modes as icons on the live-view image.

10 Claims, 14 Drawing Sheets

DISPLAY SCENE MODE ICONS

CAPTURE IMAGE ONCE

OBTAIN RAW DATA

PROCESS IMAGE TO CORRESPOND
TO DETERMINED SCENE MODE ICONS

FIG. 7A
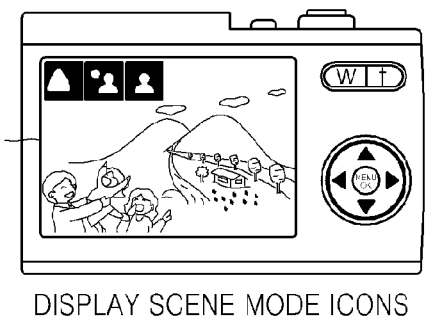
DISPLAY SCENE MODE ICONS
FIG. 7B
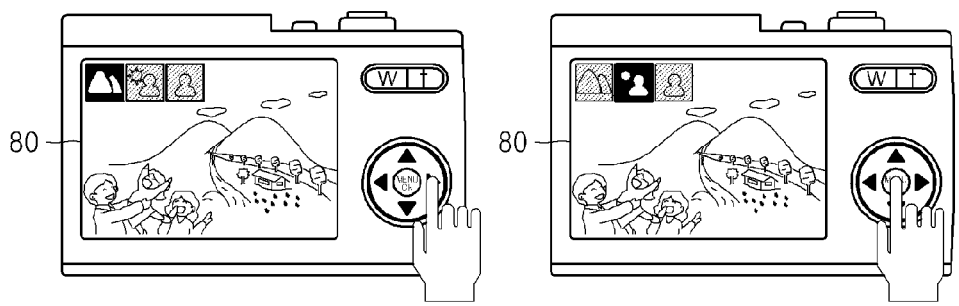
SELECT SCENE MODE ICON
FIG. 7C
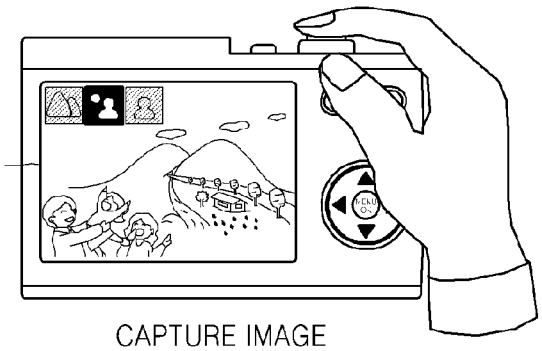
CAPTURE IMAGE
FIG. 7D           FIG. 7E
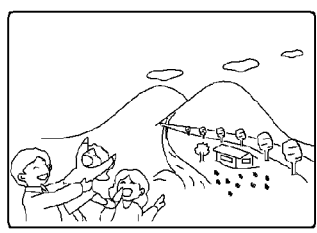  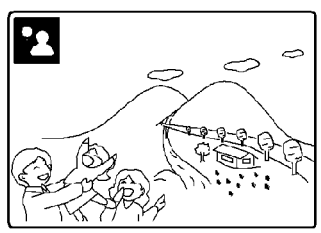
OBTAIN RAW DATA    PROCESS IMAGE TO CORRESPOND
                   TO SELECTED SCENE MODE ICON

DISPLAY SCENE MODE ICONS

PERFORM BRACKETING TO
OBTAIN IMAGES CORRESPONDING TO
NUMBER OF SCENE MODE ICONS

OBTAIN FIRST RAW DATA

PROCESS IMAGE TO CORRESPOND
TO LANDSCAPE MODE

OBTAIN SECOND RAW DATA

PROCESS IMAGE TO CORRESPOND
TO BACKLIGHT PORTRAIT MODE

OBTAIN THIRD RAW DATA

PROCESS IMAGE TO CORRESPOND
TO PORTRAIT MODE

METHOD AND APPARATUS FOR PROCESSING IMAGE BASED ON SCENE MODE DISPLAY

CROSS-REFERENCE TO RELATED PATENT APPLICATION

This application claims the benefit of Korean Patent Application No. 10-2009-0092471, filed on Sep. 29, 2009, in the Korean Intellectual Property Office, the entire disclosure of which is incorporated herein by reference.

BACKGROUND OF THE INVENTION

1. Field of the Invention

The present invention relates to a method and apparatus for processing an image based on a scene mode display by displaying and executing one or more scene modes.

2. Description of the Related Art

Some digital image processing apparatuses provide a scene mode recognition or selection function. A scene mode applicable to a live image is selected and the selected scene mode is displayed as an icon on the live image. FIG. 15 is an image for describing selecting a scene mode on a conventional digital image processing apparatus.

FIG. 15 illustrates a case when a landscape mode is selected or recognized to be applicable to the live-view image. Although there may be other scene modes that may be applicable such as landscape mode, portrait mode, backlight portrait mode, or backlight mode, only one scene mode is selected and displayed.

However, if only one scene mode is selected and displayed, the conventional digital image processing apparatus may for a live-view image that includes elements of more than one scene mode switch back and forth between the selection of different scene modes. For example, if a live-view image includes elements of a landscape mode and elements of a backlight portrait mode, the digital image processing apparatus may switch back and forth between the selection of the landscape mode and the backlight portrait mode.

As such users may perceive a misrecognition of a scene mode and thus the reliability of a digital image processing apparatus may be reduced.

SUMMARY OF THE INVENTION

The present invention provides a method and apparatus for processing an image based on a scene mode display.

An image processing apparatus is provided. The image processing apparatus include a digital signal processor (DSP) configured to select scene modes applicable to a live-view image and configured to display the selected scene modes as icons on the live-view image.

The DSP may be configured to process an image captured from the live-view image once for each of the selected scene modes using image processing techniques associated with the corresponding scene mode.

The DSP may be configured to chose one scene mode from among the selected scene modes and process an image captured from the live-view image using image processing techniques associated with the one scene mode.

The DSP may be configured to capture an image of the live-view image once for each of the selected scene modes using image capture settings associated with the corresponding scene mode.

The DSP may include a mode detection unit configured to determine the applicability of scene modes to a live-view image; a mode determination unit configured to select a predetermined number of scene modes based on the applicability of the scene modes to the live-view image; and a control unit configured to display the selected scene modes on the live-view image as icons.

The mode detection unit may be configured to evaluate multiple times the applicability of scene modes to a live-view image being updated in real time and for each evaluation determine whether scene modes are applicable to the live-view image or not, and wherein the mode determination unit is configured to select the predetermined number of scene modes based on a number of times each scene mode is evaluated to be applicable to the live-view image.

An image processing apparatus is provided. The image processing apparatus may include a digital signal processor (DSP) configured to select scene modes applicable to a live-view image, to display the selected scene modes on the live-view image, and to process an image captured from the live-view image once for each of the selected scene modes according to image processing techniques associated with the corresponding scene mode.

The DSP may include a mode detection unit configured to determine the applicability of scene modes to a live-view image; a mode determination unit configured to select a predetermined number of scene modes based on the applicability of the scene modes to the live-view image; an image processing unit configured to process an image captured from the live-view image using image processing techniques associated with a scene mode; and a control unit configured to display the selected scene modes on the live-view image as icons and control image processing on the captured image based on the image processing techniques associated with the displayed selected scene modes.

A digital signal processor (DSP) is provided. The digital signal processor (DSP) may be configured to select scene modes applicable to a live-view image and configured to display the selected scene modes as icons on the live-view image, to chose one scene mode from among the selected scene modes and process an image captured from the live-view image using image processing techniques associated with the one scene mode.

The DSP may include a mode detection unit configured to determine the applicability of scene modes to a live-view image; a mode determination unit configured to select a predetermined number of scene modes based on the applicability of the scene modes to the live-view image; an image processing unit configured to process an image captured from the live-view image using image processing techniques associated with a scene mode; and a control unit configured to display the selected predetermined number of scene modes on the live-view image as icons, receive a selection signal indicating a selection of one of the predetermined number of scene modes, and control image processing on the captured image using the image processing techniques associated with the selected one of the predetermined number of scene modes.

An image processing apparatus is provided. The image processing apparatus may include a digital signal processor (DSP) for detecting one or more scene modes from a live-view image, displaying the detected scene modes on the live-view image, and processing a series of bracketed images corresponding to the number of displayed scene modes, which are obtained by performing bracketing on the live-view image, into images corresponding to the displayed scene modes.

The DSP may include a mode detection unit for detecting one or more scene modes from a live-view image that is input in real time; a mode determination unit for determining a predetermined number of scene modes from among the detected scene modes; an image processing unit for processing a series of bracketed images, which are obtained by performing bracketing on the live-view image, into images corresponding to the determined scene modes; and a control unit for displaying the determined scene modes on the live-view image as objects, controlling bracketing to be performed to obtain a series of bracketed images corresponding to the number of the displayed objects, and controlling image processing to be performed on the bracketed images based on the displayed objects.

An image processing method is provided. The image processing method may include selecting scene modes applicable to a live-view image; and displaying the selected scene modes as icons on the live-view image.

The image processing method may include processing an image captured from the live-view image once for each of the selected scene modes using image processing techniques associated with the corresponding scene mode.

The image processing method may include choosing one scene mode from among the selected scene modes; and processing an image captured from the live-view image using image processing techniques associated with the one scene mode.

The image processing method may include capturing an image of the live-view image once for each of the selected scene modes using image capture settings associated with the corresponding scene mode; and processing each of the captured images using image processing techniques associated with the corresponding scene mode.

Selecting scene modes may include evaluating multiple times the applicability of a group of scene modes to a live-view image being updated in real time; for each evaluation determining whether each scene mode of the group of scene modes is applicable to a live-view image or not; and selecting scene modes applicable to the live-view image based on a number of times each scene mode is evaluated to be applicable to the live-view image.

An image processing method is provided. The image processing method may include detecting one or more scene modes from a live-view image; displaying the detected scene modes on the live-view image; and processing an image captured from the live-view image into images corresponding to the displayed scene modes.

An image processing method is provided. The image processing method may include detecting one or more scene modes from a live-view image; displaying the detected scene modes on the live-view image; selecting a scene mode from among the displayed scene modes; and processing an image captured from the live-view image into an image corresponding to the selected scene mode.

An image processing method is provided. The image processing method may include detecting one or more scene modes from a live-view image; displaying the detected scene modes on the live-view image; performing bracketing on the live-view image to obtain a series of bracketed images corresponding to the number of displayed scene modes; and processing the bracketed images into images corresponding to the displayed scene modes.

BRIEF DESCRIPTION OF THE DRAWINGS

The above and other features and advantages of the present invention will become more apparent by describing in detail exemplary embodiments thereof with reference to the attached drawings in which:

FIGS. 7A through 7E are images for describing an example of image processing based on a scene mode display;

FIGS. 9A, 9B, 9C-1 through 9C-3, and 9D-1 through 9D-3 are images for describing an example of image processing based on a scene mode display;

DETAILED DESCRIPTION OF THE INVENTION

Hereinafter, the present invention will be described in detail by explaining embodiments of the invention with reference to the attached drawings. The invention may, however, be embodied in many different forms and should not be construed as being limited to the embodiments set forth herein.

Figure 1:
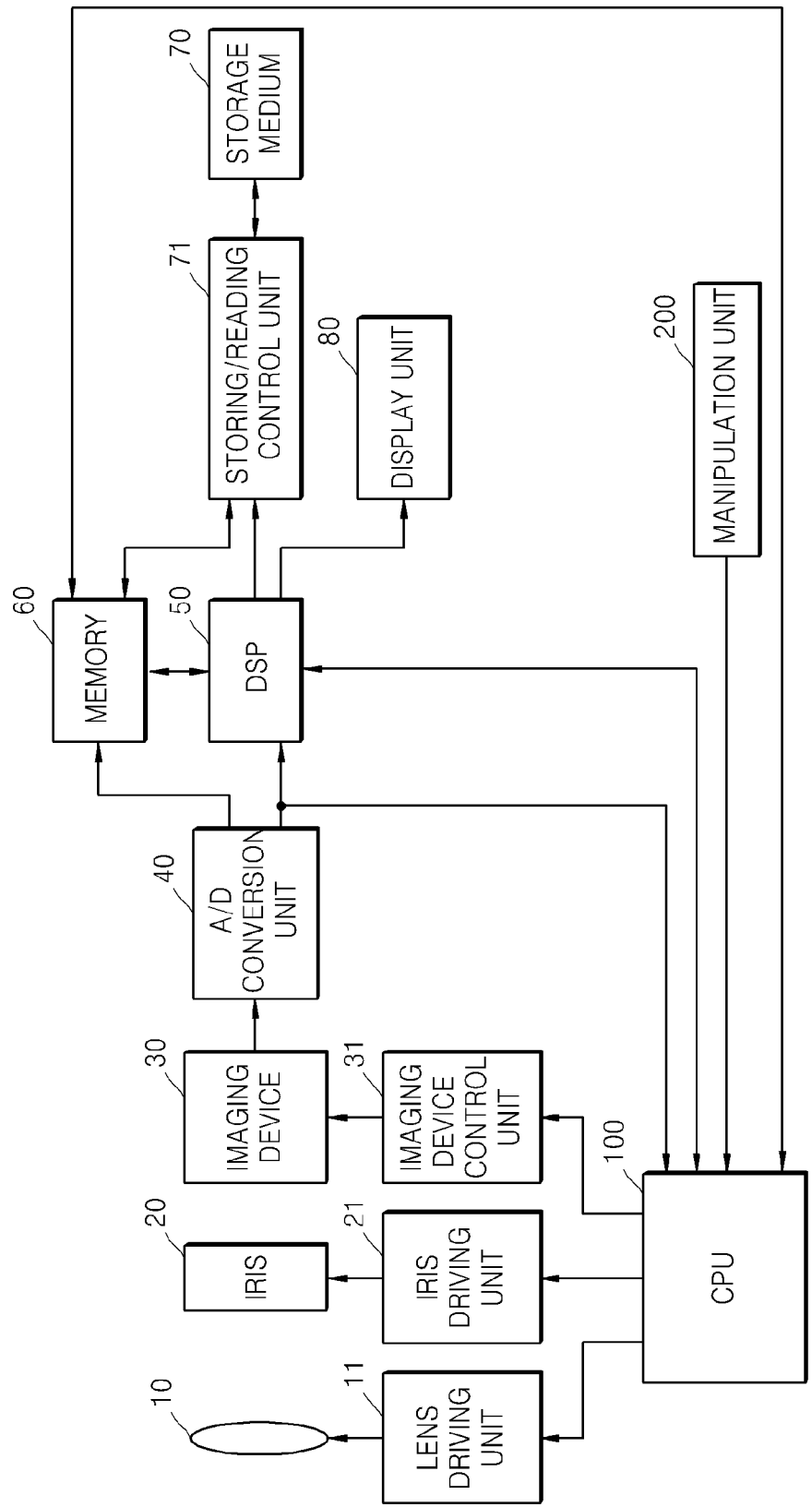
FIG. 1 is a block diagram of an example of an image processing apparatus based on a scene mode display.

FIG. 1 is a block diagram of a graphic user interface (GUI) display device as an example of an image processing apparatus. In particular, the image processing apparatus illustrated in FIG. 1 is a digital photographing apparatus for controlling GUI outputs. However, the image processing apparatus is not limited thereto and the image processing apparatus may also be applied to image processing apparatuses such as a personal digital assistant (PDA), a mobile telephone, and a personal multimedia player (PMP).

Referring to FIG. 1, the image processing apparatus includes a central processing unit (CPU) 100 for controlling all operations of the image processing apparatus. The image processing apparatus also includes a manipulation unit 200 including keys for generating an electrical signal based on a user's input. An electrical signal generated by the manipulation unit 200 is transmitted to the CPU 100 so that the CPU 100 may control the image processing apparatus in response to the electrical signal.

In a photographing mode, when an electrical signal based on a user's input is input to the CPU 100, the CPU 100 analyzes the electrical signal and controls a lens driving unit 11, an iris driving unit 21, and an imaging device control unit 31 so as to respectively control the position of a lens 10, the degree of openness of an iris 20, and the sensitivity of an imaging device 30. The imaging device 30 generates data from incident light. An analog/digital (A/D) converter 40 converts analog data output from the imaging device 30 into digital data. In some cases, the A/D converter 40 may not be included according to characteristics of the imaging device 30, for example, if the imaging device 30 is a digital device.

The data output from the imaging device 30 may be input to a digital signal processor (DSP) 50 directly or via a memory 60. Also, the data output from the imaging device 30 may be input to the CPU 100, if necessary. The memory 60 may be a read-only memory (ROM) or a random access memory (RAM). The DSP 50 may perform digital signal processing such as gamma correction, white balance correction and the like, if needed. Also, as illustrated in FIGS. 2, 4, 6 and 8, the DSP 50 may include a mode detection unit 51, a mode determination unit 52, a bracketing unit 53, an image processing unit 54 and a control unit 55. Here, various arrangements may be made. For example, the mode detection unit 51, the mode determination unit 52, the bracketing unit 53, the image processing unit 54, and the control unit 55 may be independent components separated from the DSP 50. Operations of the mode detection unit 51, the mode determination unit 52, the bracketing unit 53, the image processing unit 54 and the control unit 55 will be described below.

The data output from the DSP 50 is transmitted to a display unit 80 via the memory 60, and the display unit 80 displays an image. The display unit 80 may be a touch screen. The data output from the DSP 50 is input to a storing/reading control unit 71 directly or via the memory 60. The storing/reading control unit 71 stores the data in a storage medium 70 automatically or in response to a signal based on a user's input. The storing/reading control unit 71 may read data from a file stored in the storage medium 70. The storage medium 70 may be detachable or non-detachable from or to the image processing apparatus.

Functions of the DSP 50 will now be described with reference to FIGS. 2 through 9.

Figure 2:
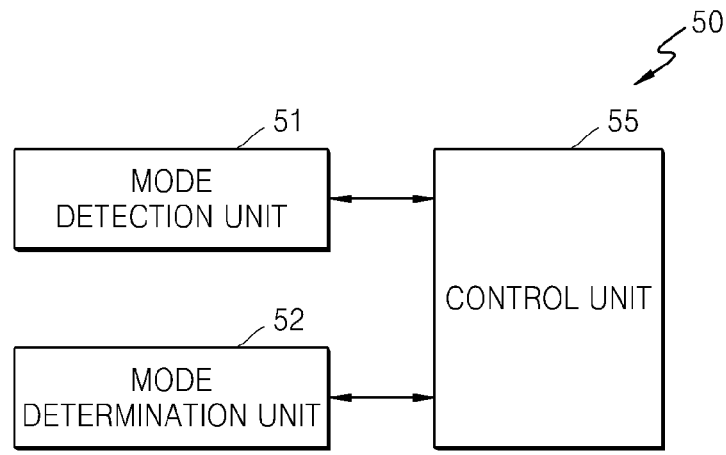
FIG. 2 is a block diagram of an example of a digital signal processor (DSP) of the image processing apparatus illustrated in FIG. 1.
Figure 3:
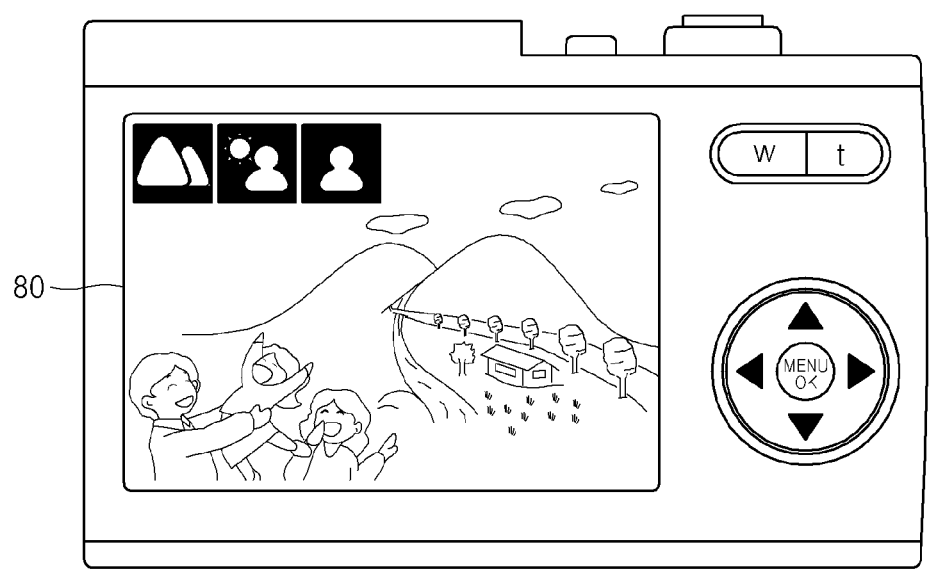
FIG. 3 is an example of an image for describing image processing based on a scene mode display.

FIG. 2 is a block diagram of an example of the DSP 50 of the image processing apparatus illustrated in FIG. 1. FIG. 3 is an example of an image for describing image processing based on a scene mode display.

Referring to FIG. 2, in order to detect one or more scene modes from a live-view image and to display the scene modes on the live-view image, the DSP 50 according to the current embodiment includes the mode detection unit 51, the mode determination unit 52 and the control unit 55.

The mode detection unit 51 detects or determines the applicability of one or more scene modes from a live-view image that is input in real time. A digital image processing apparatus may support scene modes such as a portrait mode, a landscape mode, a night landscape mode, a night portrait mode, a backlight mode and a backlight portrait mode. If a face is detected from the live-view image, the mode detection unit 51 detects the portrait mode or determines that the portrait mode is applicable to the live-view image. If an auto-focus (AF) value when the live-view image is auto-focused is infinite, the mode detection unit 51 detects the landscape mode, or determines that the landscape mode is applicable to the live-view image. The mode detection unit 51 divides the live-view image into a predetermined number of regions and determines whether a bright region exists from among the divided regions if an average brightness of the divided regions is lower than a threshold value. If a bright region exits, the mode detection unit 51 detects the night landscape mode or determines that the night landscape mode is applicable. If a face is detected in the night landscape mode, the mode detection unit 51 detects the night portrait mode or determines that the night portrait mode is applicable. The mode detection unit 51 divides the live-view image into a predetermined number of regions and determines whether a brighter region having a brightness higher than an average brightness of the divided regions exists. If a brighter region exists, the mode detection unit 51 detects the backlight mode, or determines that the backlight mode is applicable. If a face is detected in the backlight mode, the mode detection unit 51 detects the backlight portrait mode or determines that the backlight portrait mode is applicable. For example, the mode detection unit 51 may detect the landscape mode, the backlight portrait mode, and the portrait mode from a live-view image illustrated in FIG. 3. In embodiments, the mode detection unit 51 determines an applicability such as a integer from one to one hundred for how applicable the scene modes are to a live-view image. In embodiments, the mode detection unit 51 may determine that a scene mode is either applicable or not applicable to a live-view image. In embodiments, the mode detection unit 51 may determine that a scene mode is either detected in a live-view image or not detected in a live-view image.

The mode determination unit 52 determines a predetermined number of scene modes from among the detected scene modes. In embodiments, the mode determination unit 52 counts the number of times that each scene mode is detected from the live-view image, and gives priorities to the detected scene modes from a scene mode having a large number of counts to a scene mode having a small number of counts. For example, if the landscape mode and the backlight mode are detected after performing first scene mode detection, the landscape mode and the portrait mode are detected after performing second scene mode detection, and the landscape mode is detected after performing third scene mode detection, the mode determination unit 52 respectively gives first, second and third priorities to the landscape mode (3), the backlight mode (2) and the portrait mode (1). Although scene mode detection is performed three times above for convenience of explanation, the number of scene mode detections is not limited to three. Also, the mode determination unit 52 sets a reference number, e.g., 100, and does not give priorities to scene modes detected less than the reference number of times. The mode determination unit 52 may be set to determine, for example, first through third priorities. However, the number of priorities is not limited to three and may differ according to a set-up value. In embodiments, the mode determination unit 52 may determine a predetermined number of scene modes based on how applicable each scene mode was determined to be by the mode detection unit 51. The mode detection unit 51 may determine how applicable each scene mode is to a live-view image repeatedly as a live-view image is updated in real time. The mode determination unit 52 may then use these applicability determinations to select a predetermined number of scene modes.

The control unit 55 displays the scene modes determined by the mode determination unit 52 on the live-view image by using icons. FIG. 3 illustrates an example when the landscape mode, the backlight portrait mode, and the portrait mode determined by the mode determination unit 52 are respectively displayed in first through third priorities by using icons under the control of the control unit 55. Thus, a problem of misrecognition of a scene may be solved by displaying one or more scene modes detected from the same photographing environment.

Then, if the live-view image is captured, the captured image may be processed into images corresponding to the displayed icons by using image processing techniques associated with the scene modes of the displayed icons. If an icon is selected from among the displayed icons and then the live-view image is captured, the captured image may be processed into an image corresponding to the selected icon by using image processing techniques associated with the scene mode corresponding to the selected icon. Alternatively, bracketing may be performed on the live-view image to obtain a series of bracketed images corresponding to the number of displayed icons, and the bracketed images may be processed into images corresponding to the displayed icons. In embodiments, a series of images may be captured for each of the scene modes from the live-view image by using image capture settings associated with the corresponding scene mode to obtain a series of images corresponding to the number of displayed icons, and the images may be processed into image corresponding to the displayed icons by using image processing techniques associated with the displayed icons. The image processing operation will be described in detail later.

Figure 4:
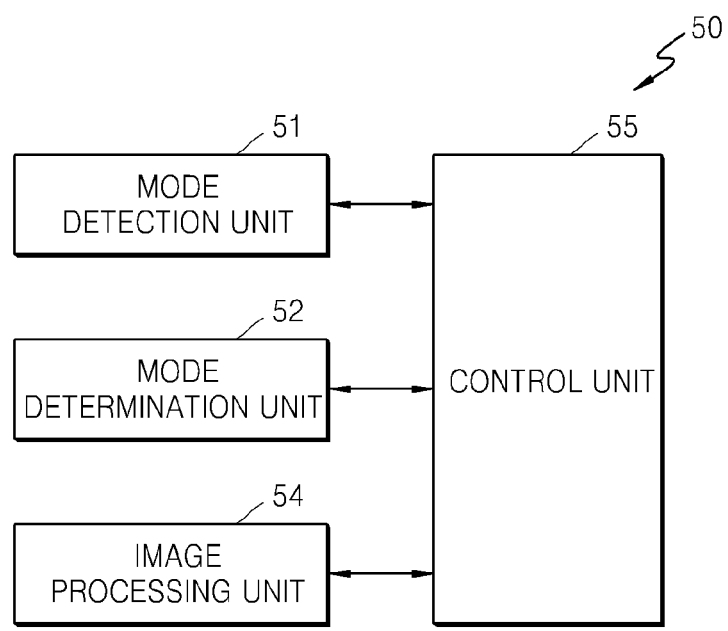
FIG. 4 is a block diagram of an example of a DSP of the image processing apparatus illustrated in FIG. 1.

FIG. 4 is a block diagram of the DSP 50 illustrated in FIG. 1, according to a second embodiment of the present invention. FIGS. 5A through 5D are images for describing image processing based on a scene mode display, according to the second embodiment of the present invention.

Referring to FIG. 4, in order to detect one or more scene modes from a live-view image, to display the scene modes on the live-view image, and to process an image captured from the live-view image into images corresponding to the displayed scene modes, the DSP 50 according to the current embodiment includes the mode detection unit 51, the mode determination unit 52, the image processing unit 54 and the control unit 55.

The mode detection unit 51 detects one or more scene modes from a live-view image that is input in real time and/or determines how applicable one or more scene modes is to a live-view image. A detailed description of the mode detection unit 51 is provided above with reference to FIG. 2 and thus will be omitted here.

The mode determination unit 52 determines a predetermined number of scene modes from among the detected scene modes. The mode determination unit 52 counts the number of times that each scene mode is detected from the live-view image, and gives priorities to the detected scene modes from a scene mode having a large number of counts to a scene mode having a small number of counts. In embodiments, the mode determination unit 52 uses the applicability of the scene modes to the live-view image to select the scene modes. A detailed description of the mode determination unit 52 is provided above with reference to FIG. 2 and thus will be omitted here.

Figure 5A:
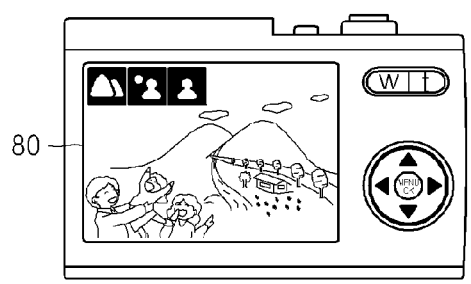
FIGS. 5A through 5D are examples of images for describing image processing based on a scene mode display.

The control unit 55 displays the scene modes determined by the mode determination unit 52 on the live-view image by using icons. FIG. 5A illustrates an example when a landscape mode, a backlight portrait mode, and a portrait mode determined by the mode determination unit 52 are respectively displayed in first through third priorities by using icons under the control of the control unit 55. Also, the control unit 55 controls image processing to be performed on an image captured from the live-view image based on the displayed icons.

The image processing unit 54 processes the captured image into images corresponding to the displayed icons.

Figure 5B:
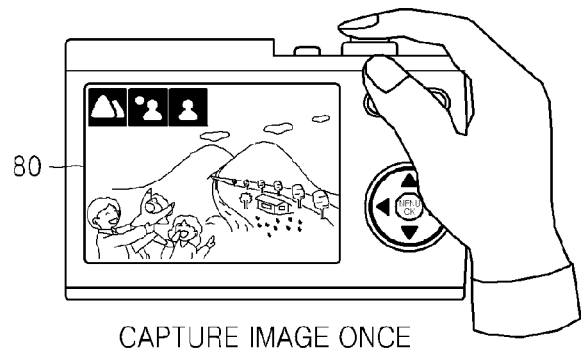
Figure 5C:
Figure 5D:
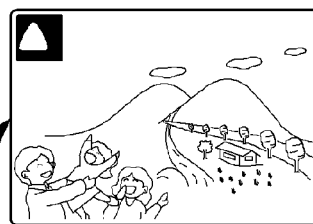
Figure 5D:
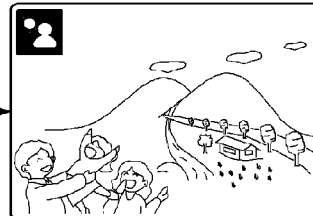
Figure 5D:

FIG. 5B illustrates an example when the live-view image on which the landscape mode, the backlight portrait mode, and the portrait mode are displayed by using icons is captured once. FIG. 5C illustrates an example of RAW data obtained by capturing the live-view image once, and FIG. 5D illustrates an example when the RAW data is processed into an image corresponding to the landscape mode, is processed into an image corresponding to the backlight portrait mode, and is processed into an image corresponding to the portrait mode.

The image processing unit 54 performs image processing on the RAW data based on the displayed scene modes. When image processing is performed based on a portrait mode, in order to brighten RAW data, the image processing unit 54 increases an exposure value according to a detected face and softens edges by using a low pass filter (LPF). When image processing is performed based on a landscape mode, the image processing unit 54 enhances edges by using a custom filter and makes colors clear by using a color correction filter. When image processing is performed based on a night landscape mode, the image processing unit 54 increases a brightness value and enhances edges. When image processing is performed based on a backlight mode, the image processing unit 54 decreases an exposure level by one level. In embodiments, there may be multiple image processing techniques associated with scene modes such as the image processing techniques described above.

Figure 6:
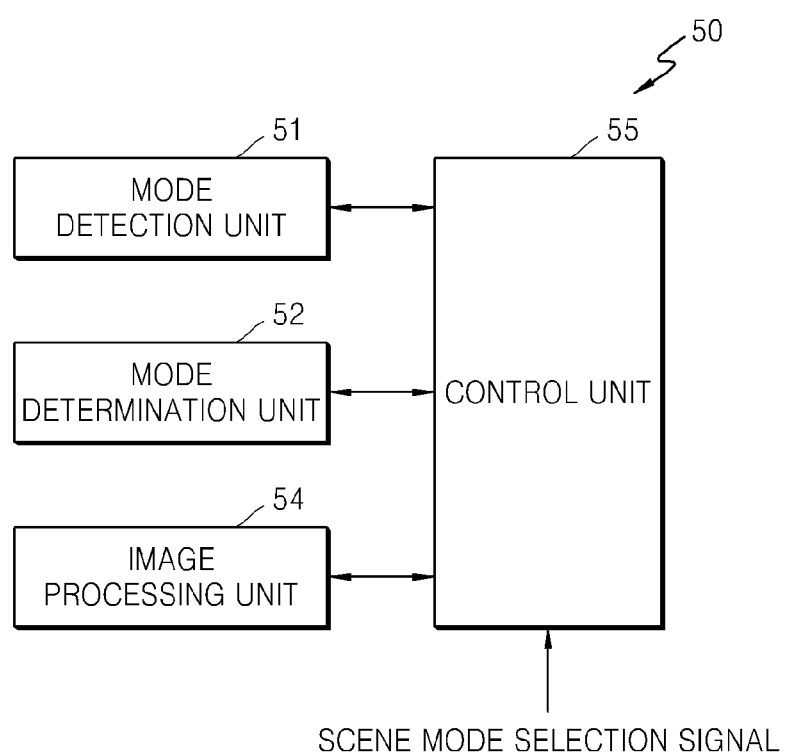
FIG. 6 is a block diagram of an example of a DSP of the image processing apparatus illustrated in FIG. 1.

FIG. 6 is a block diagram of another example of the DSP 50 illustrated in FIG. 1. FIGS. 7A through 7E are examples of images for describing image processing based on a scene mode display.

Referring to FIG. 6, in order to detect one or more scene modes from a live-view image, to display the scene modes on the live-view image, and to process an image captured from the live-view image into an image corresponding to a scene mode selected from among the displayed scene modes, the DSP 50 according to the current embodiment includes the mode detection unit 51, the mode determination unit 52, the image processing unit 54 and the control unit 55.

The mode detection unit 51 detects one or more scene modes from a live-view image that is input in real time and/or determines how applicable one or more scene modes is to a live-view image. A detailed description of the mode detection unit 51 is provided above with reference to FIG. 2 and thus will be omitted here.

The mode determination unit 52 determines a predetermined number of scene modes from among the scene modes. A detailed description of the mode determination unit 52 is provided above with reference to FIG. 2 and thus will be omitted here.

The control unit 55 displays the scene modes determined by the mode determination unit 52 on the live-view image by using icons, receives an icon selection signal, and controls the image processing unit 54 to process an image captured from the live-view image into an image corresponding to a selected icon.

FIG. 7A illustrates an example when a landscape mode, a backlight portrait mode, and a portrait mode determined by the mode determination unit 52 are respectively displayed in first through third priorities by using icons under the control of the control unit 55. FIG. 7B illustrates an example when the icon of the backlight portrait mode is selected by using a menu button. FIG. 7C illustrates an example of an image captured from the live-view image after the icon of the backlight portrait mode is selected.

Then, the image processing unit 54 processes the captured image into an image corresponding to the selected icon, i.e., the icon of the backlight portrait mode by using image processing techniques associated with the portrait mode. FIG. 7D illustrates an example of RAW data obtained by capturing the live-view image, and FIG. 7E illustrates an example when the RAW data is processed into an image corresponding to the backlight portrait mode. When image processing is performed based on a backlight portrait mode, the image processing techniques include the image processing unit 54 decreasing an exposure level by one level, increasing an exposure value according to a detected face, and softening edges by using an LPF.

Figure 8:
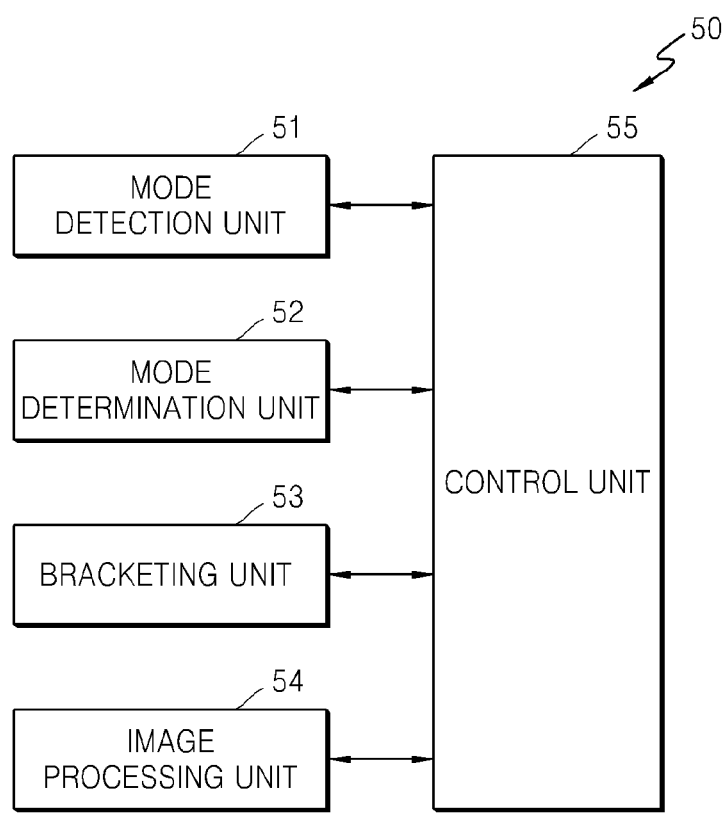
FIG. 8 is a block diagram of an example of a DSP of the image processing apparatus illustrated in FIG. 1.

FIG. 8 is a block diagram of an example of the DSP 50 illustrated in FIG. 1. FIGS. 9A, 9B, 9C-1 through 9C-3, and 9D-1 through 9D-3 are example images for describing image processing based on a scene mode display.

Referring to FIG. 8, in order to detect one or more scene modes from a live-view image, to display the scene modes on the live-view image, and to process a series of bracketed images corresponding to the number of displayed scene modes, which are obtained by performing bracketing on the live-view image, into images corresponding to the displayed scene modes, the DSP 50 according to the current embodiment includes the mode detection unit 51, the mode determination unit 52, the bracketing unit 53, the image processing unit 54 and the control unit 55.

The mode detection unit 51 detects one or more scene modes from a live-view image that is input in real time. A detailed description of the mode detection unit 51 is provided above with reference to FIG. 2 and thus will be omitted here.

The mode determination unit 52 determines a predetermined number of scene modes from among the detected scene modes. A detailed description of the mode determination unit 52 is provided above with reference to FIG. 2 and thus will be omitted here.

The control unit 55 displays the scene modes determined by the mode determination unit 52 on the live-view image by using icons, controls the bracketing unit 53 to perform bracketing on the live-view image to obtain a series of bracketed images corresponding to the number of displayed icons, and controls the image processing unit 54 to process the bracketed images into images corresponding to the displayed icons by using image processing technique associated with the corresponding scene mode. In embodiments, the bracketing unit 53 may capture an image for each of the scene modes from the live-view image by using image capture settings associated with the corresponding scene mode to obtain a series of images corresponding to the number of displayed icons.

Figure 9A:
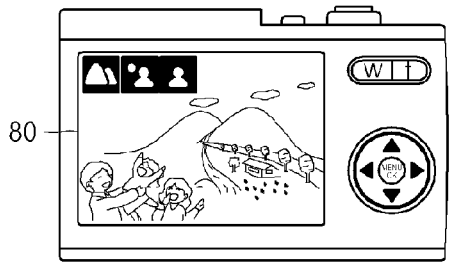

FIG. 9A illustrates an example when a landscape mode, a backlight portrait mode, and a portrait mode determined by the mode determination unit 52 are respectively displayed in first through third priorities by using icons under the control of the control unit 55.

Figure 9B:
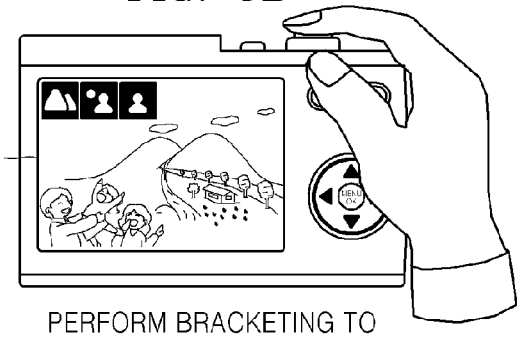

The bracketing unit 53 performs bracketing on the live-view image to obtain a series of bracketed images corresponding to the number of displayed icons in response to an input of a shutter-release button. FIG. 9B illustrates an example when bracketing is performed on the live-view image to obtain three bracketed images in response to an input of a shutter-release button. In embodiments, the bracketing unit 53 captures the live-view image using image capture settings associated with the corresponding scene mode.

The image processing unit 54 processes the bracketed images into images corresponding to the displayed icons.

Figures 1, 9C:
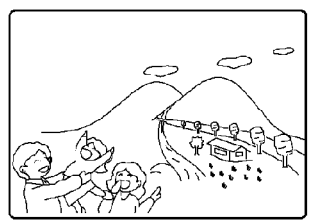
Figures 1, 9D:
Figures 2, 9C:
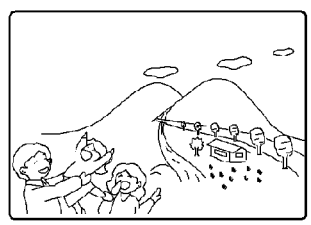
Figures 2, 9D:
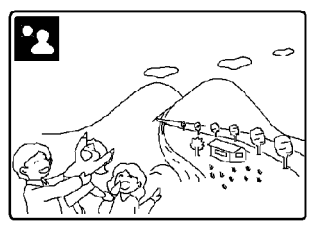
Figures 3, 9C:
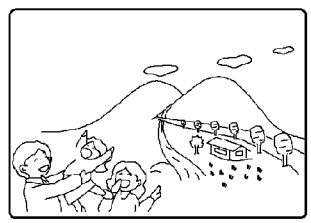
Figures 3, 9D:
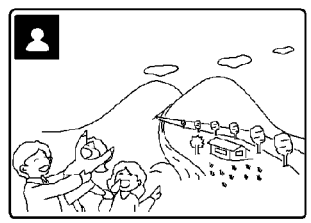

FIG. 9C-1 illustrates an example of first bracketed RAW data, and FIG. 9D-1 illustrates an example when the first bracketed RAW data is processed into an image corresponding to the landscape mode. When image processing is performed based on a landscape mode, the image processing unit 54 may use the following image processing techniques: enhancing edges by using a custom filter and making colors clearer by using a color correction filter.

FIG. 9C-2 illustrates an example of second bracketed RAW data, and FIG. 9D-2 illustrates an example when the second bracketed RAW data is processed into an image corresponding to the backlight portrait mode. When image processing based on a backlight portrait mode is performed, the image processing unit 54 decreases an exposure level by one level, increases an exposure value according to a detected face, and softens edges by using an LPF.

FIG. 9C-3 illustrates an example of third bracketed RAW data, and FIG. 9D-3 illustrates an example when the third bracketed RAW data is processed into an image corresponding to the portrait mode. When image processing is performed based on a portrait mode, in order to brighten RAW data, the image processing unit 54 increases an exposure value according to a detected face and softens edges by using an LPF.

An image processing method based on a scene mode display, according to an embodiment of the present invention, will now be described with reference to FIGS. 10 through 14. The image processing method may be performed in the digital image processing apparatus illustrated in FIG. 1, and the image processing method may be performed in the DSP 50 illustrated in FIG. 1 with the aid of the other components of the digital image processing apparatus.

Figure 10:
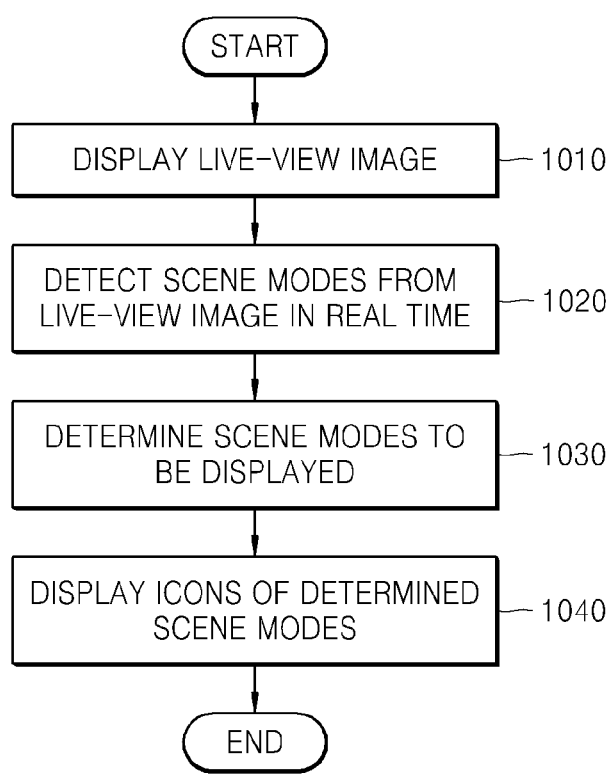
FIG. 10 is a flowchart of an example of an image processing method based on a scene mode display.

FIG. 10 is a flowchart of an example of an image processing method based on a scene mode display. FIG. 10 will be described in conjunction with FIG. 1.

Referring to FIG. 10, when a live-view image is displayed on the display unit 80 (operation 1010), the DSP 50 detects scene modes from the live-view image in real time (operation 1020) and/or determines the applicability of the scene modes to the live-view image.

The DSP 50 may detect and/or determine the applicability of scene modes such as a portrait mode, a landscape mode, a night landscape mode, a night portrait mode, a backlight mode and a backlight portrait mode. If a face is detected from the live-view image, the DSP 50 detects the portrait mode. If an AF value when the live-view image is auto-focused is infinite, the DSP 50 detects the landscape mode. The DSP 50 divides the live-view image into a predetermined number of regions and determines whether a bright region exists from among the divided regions if an average brightness of the divided regions is lower than a threshold value. If a bright region exits, the DSP 50 detects the night landscape mode. If a face is detected in the night landscape mode, the DSP 50 detects the night portrait mode. The DSP 50 divides the live-view image into a predetermined number of regions and determines whether a brighter region having a brightness higher than an average brightness of the divided regions exits. If a brighter region exists, the DSP 50 detects the backlight mode. If a face is detected in the backlight mode, the DSP 50 detects the backlight portrait mode.

When the scene modes are completely detected, the DSP 50 determines scene modes to be displayed on the live-view image (operation 1030).

Figure 11:
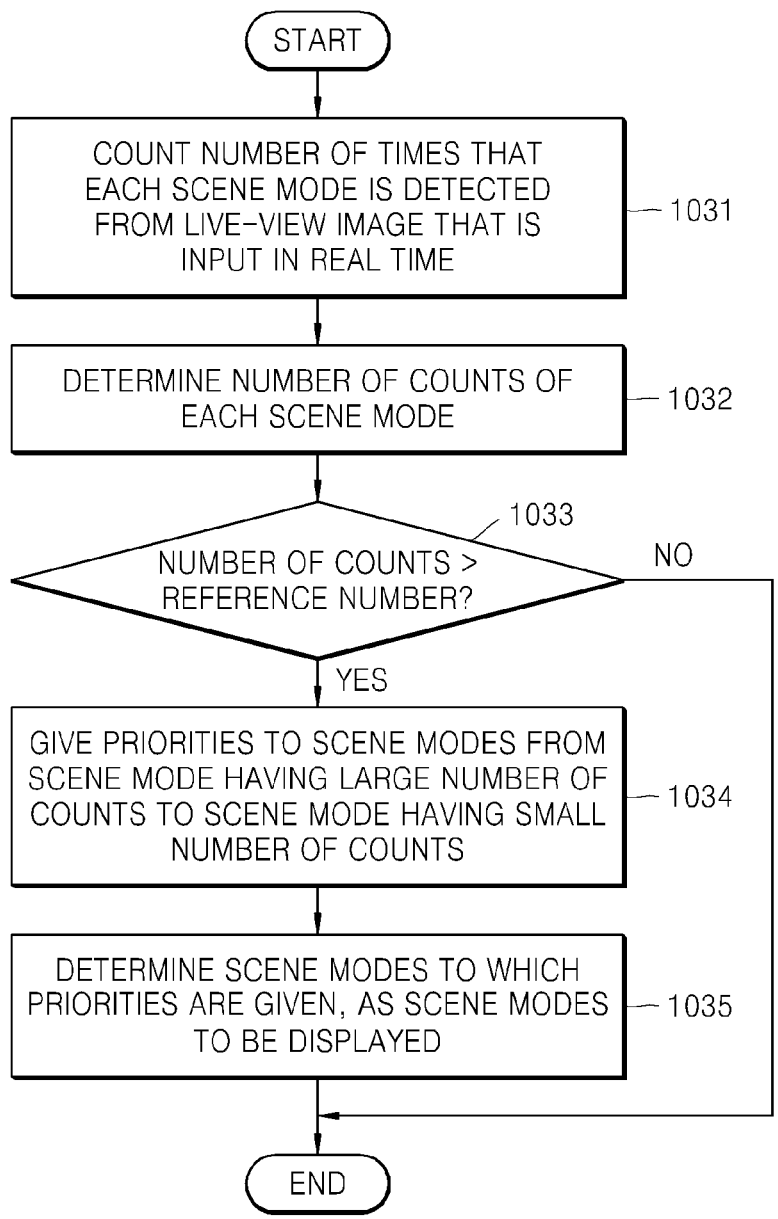
FIG. 11 is a flowchart of an example of a scene mode determination operation in the image processing method illustrated in FIG. 10.

FIG. 11 is a flowchart of the scene mode determination operation in the image processing method illustrated in FIG. 10, according to an embodiment of the present invention. FIG. 11 will be described in conjunction with FIG. 1.

Referring to FIG. 11, the DSP 50 counts the number of times that each scene mode is detected from a live-view image that is input in real time (operation 1031). Then, the DSP 50 determines the number of counts of each scene mode (operation 1032), and determines whether the number of counts exceeds a reference number, e.g., 100 (operation 1033). The DSP 50 gives priorities to the detected scene modes of which the number of counts exceeds the reference number, from a scene mode having a large number of counts to a scene mode having a small number of counts (operation 1034). For example, if the landscape mode and the backlight mode are detected after performing first scene mode detection, the landscape mode and the portrait mode are detected after performing second scene mode detection, and the landscape mode is detected after performing third scene mode detection, the DSP 50 respectively gives first, second and third priorities to the landscape mode (3), the backlight mode (2) and the portrait mode (1). Although scene mode detection is performed three times above for convenience of explanation, the number of scene mode detections is not limited to three. Also, the DSP 50 determines the scene modes to which the priorities are given, as scene modes to be displayed (operation 1035). In embodiments, the DSP 50 may determine the applicability of the scene modes to the live-view image multiple times and select scene modes to display based on the how applicable each of the scene modes is.

Referring back to FIG. 10, when the scene modes to be displayed are determined, the DSP 50 displays icons of the determined scene modes on the live-view image (operation 1040).

Figure 12:
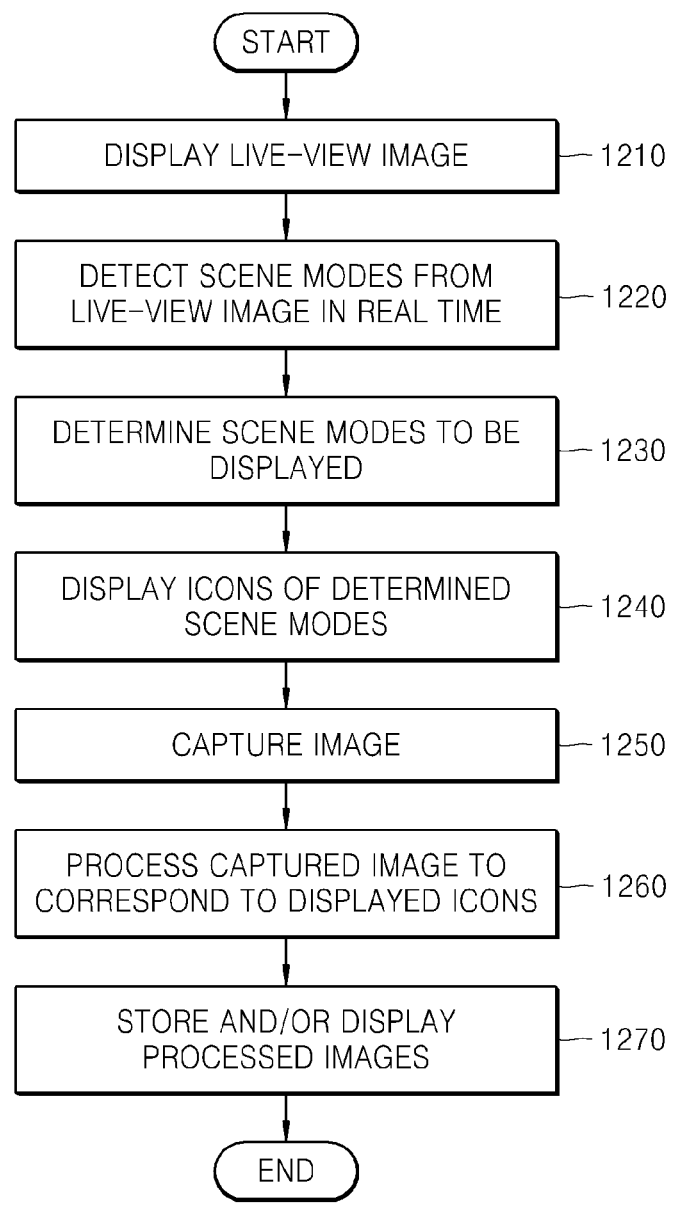
FIG. 12 is a flowchart of an example of an image processing method based on a scene mode display.

FIG. 12 is a flowchart of an image processing method based on a scene mode display. FIG. 12 will be described in conjunction with FIG. 1.

Referring to FIG. 12, when a live-view image is displayed on the display unit 80 (operation 1210), the DSP 50 detects scene modes from the live-view image in real time (operation 1220). A detailed description of the scene mode detection operation is provided above with reference to FIG. 10 and thus will be omitted here.

When the scene modes are completely detected, the DSP 50 determines scene modes to be displayed on the live-view image (operation 1230). A detailed description of the scene mode determination operation is provided above with reference to FIG. 11 and thus will be omitted here.

When the scene modes to be displayed are determined, the DSP 50 displays icons of the determined scene modes on the live-view image (operation 1240).

Then, when the live-view image is captured in response to an input of a shutter-release button (operation 1250), the DSP 50 processes the captured image into images corresponding to the displayed icons (operation 1260). The DSP 50 processes RAW data obtained by capturing the live-view image once into images corresponding to the displayed icons by using image processing techniques associated with the displayed icons. For example, if the displayed icons are icons of a landscape mode, a backlight portrait mode, and a portrait mode, the DSP 50 processes the RAW data into images corresponding to the landscape mode, the backlight portrait mode, and the portrait mode.

When image processing is performed based on a portrait mode, in order to brighten RAW data, the DSP 50 increases an exposure value according to a detected face and softens edges by using a low pass filter. When image processing is performed based on a landscape mode, the DSP 50 enhances edges by using a custom filter and makes colors clear by using a color correction filter. When image processing is performed based on a night landscape mode, the DSP 50 increases a brightness value and enhances edges. When image processing is performed based on a backlight mode, the DSP 50 decreases an exposure level by one level.

When the captured image is completely processed, the DSP 50 stores and/or displays the processed images (operation 1270).

Figure 13:
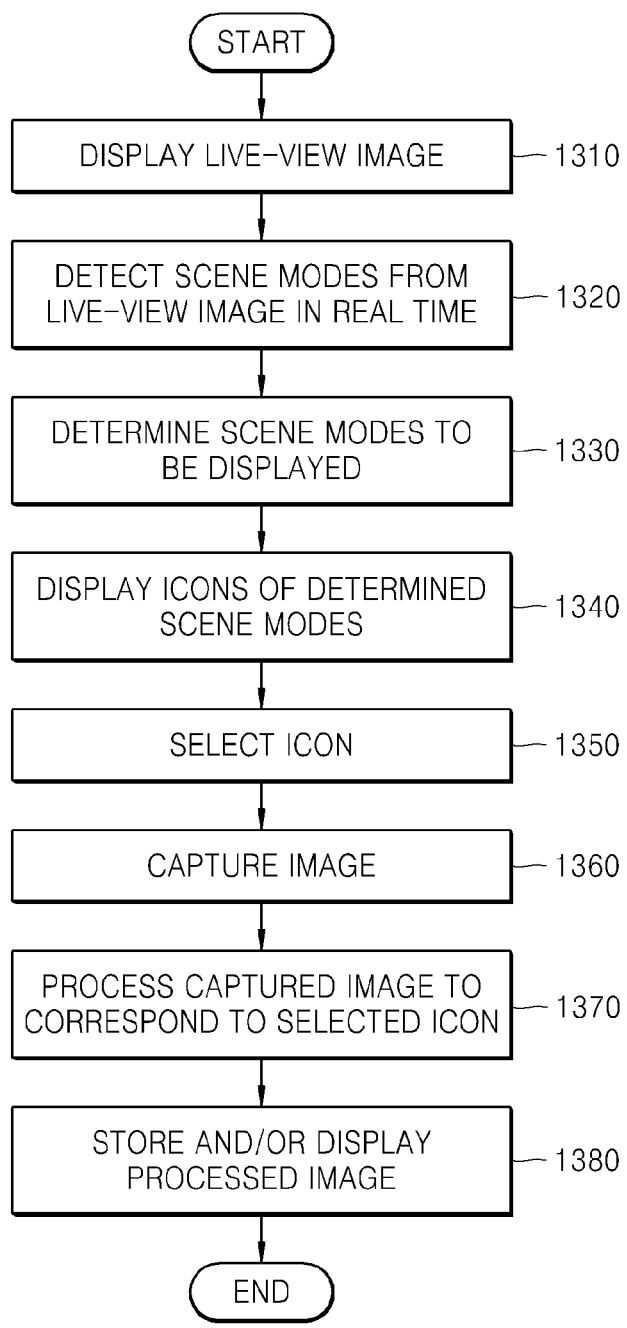
FIG. 13 is a flowchart of an example of an image processing method based on a scene mode display.

FIG. 13 is a flowchart of an image processing method based on a scene mode display, according to the third embodiment of the present invention. FIG. 13 will be described in conjunction with FIG. 1.

Referring to FIG. 13, when a live-view image is displayed on the display unit 80 (operation 1310), the DSP 50 detects scene modes from the live-view image in real time and/or determines how applicable scene modes are to the live-view image (operation 1320). A detailed description of the scene mode detection operation is provided above with reference to FIG. 10 and thus will be omitted here.

When the scene modes are completely detected, the DSP 50 determines scene modes to be displayed on the live-view image (operation 1330). A detailed description of the scene mode determination operation is provided above with reference to FIG. 11 and thus will be omitted here.

When the scene modes to be displayed are determined, the DSP 50 displays icons of the determined scene modes on the live-view image (operation 1340). For example, the displayed icons may be icons of a landscape mode, a backlight portrait mode, and a portrait mode.

Then, the DSP 50 receives an icon selection signal for selecting an icon from among the displayed icons (operation 1350). For example, the icon of the backlight portrait mode may be selected.

After an icon is selected from among the displayed icons, when the live-view image is captured in response to an input of a shutter-release button (operation 1360), the DSP 50 processes the captured image into an image corresponding to the selected icon (operation 1370). The DSP 50 processes RAW data obtained by capturing the live-view image once into an image corresponding to the selected icon, e.g., an image corresponding to the backlight portrait mode by using image processing techniques associated with the backlight portrait mode. For example, the DSP 50 decreases an exposure level by one level, increases an exposure value according to a detected face, and softens edges by using an LPF.

When the captured image is completely processed, the DSP 50 stores and/or displays the processed image (operation 1380).

Figure 14:
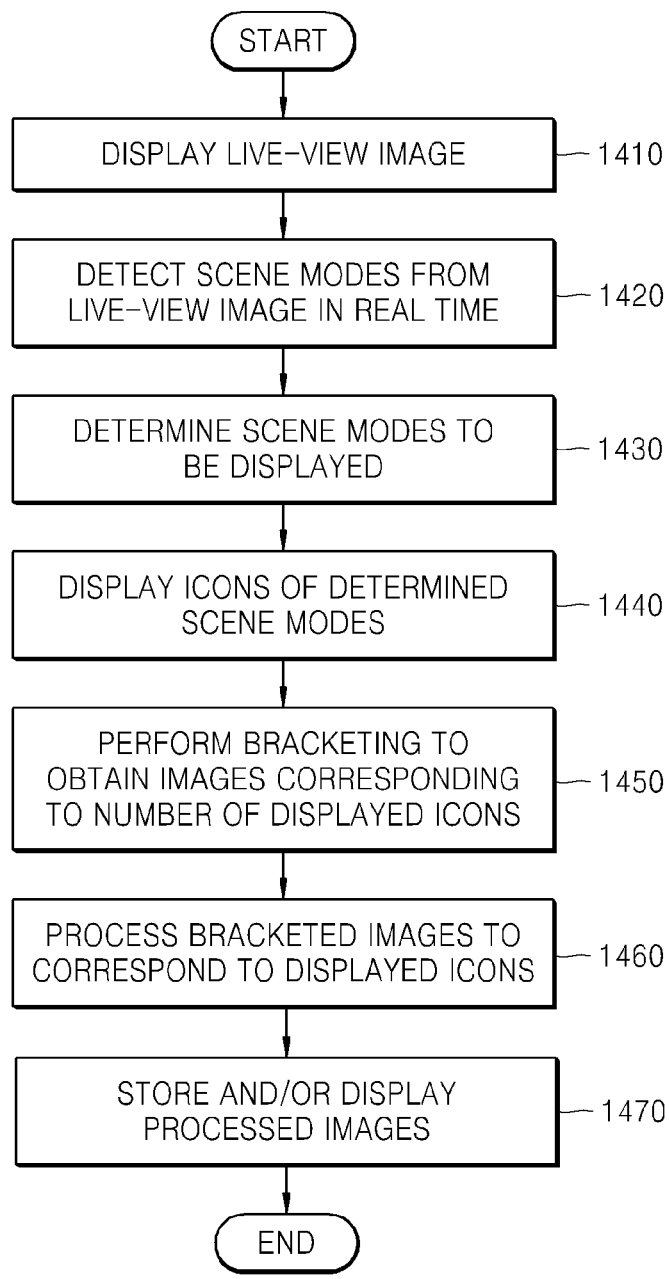
FIG. 14 is a flowchart of an example of an image processing method based on a scene mode display.
Figure 15:
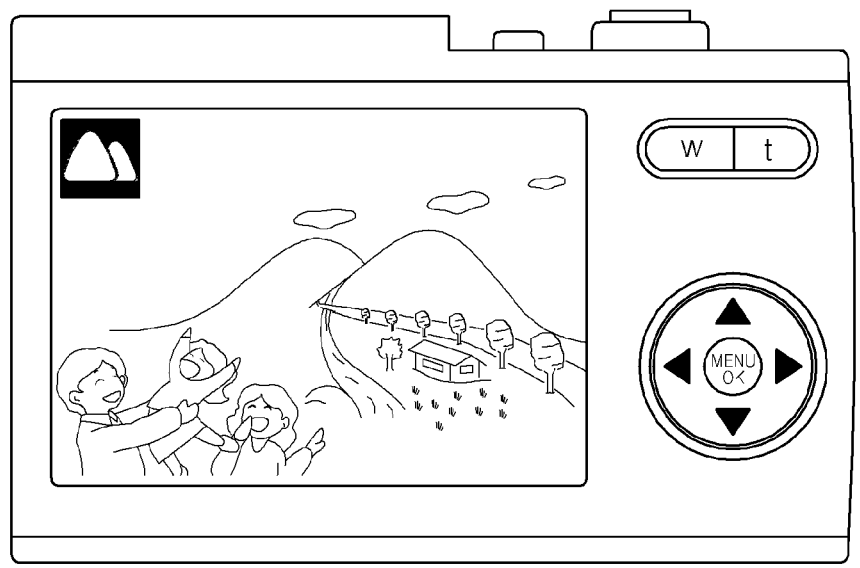
FIG. 15 is an image for describing an example of a scene recognition mode of a conventional digital image processing apparatus.

FIG. 14 is a flowchart of an example of an image processing method based on a scene mode display. FIG. 14 will be described in conjunction with FIG. 1.

Referring to FIG. 14, when a live-view image is displayed on the display unit 80 (operation 1410), the DSP 50 detects scene modes from the live-view image in real time and/or determines how applicable scene modes are to the live-view image (operation 1420). A detailed description of the scene mode detection operation is provided above with reference to FIG. 10 and thus will be omitted here.

When the scene modes are completely detected, the DSP 50 determines scene modes to be displayed on the live-view image (operation 1430). A detailed description of the scene mode determination operation is provided above with reference to FIG. 11 and thus will be omitted here.

When the scene modes to be displayed are determined, the DSP 50 displays icons of the determined scene modes on the live-view image (operation 1440). For example, the displayed icons may be icons of a landscape mode, a backlight portrait mode, and a portrait mode.

Then, when an input of a shutter-release button is received, the DSP 50 performs bracketing on the live-view image to obtain a series of bracketed images corresponding to the number of displayed icons (operation 1450). For example, three bracketed images may be obtained in response to an input of a shutter-release button. In embodiments, the DSP 50 uses image capture settings associated with the corresponding scene mode to capture each of the images.

When bracketing is completely performed, the DSP 50 processes the bracketed images into images corresponding to the displayed icons (operation 1460).

The DSP 50 processes first bracketed RAW data into an image corresponding to the landscape mode by using image processing techniques associated with the landscape mode.

When image processing is performed based on a landscape mode, the DSP 50 enhances edges by using a custom filter and makes colors clear by using a color correction filter. The DSP 50 processes second bracketed RAW data into an image corresponding to the backlight portrait mode. When image processing is performed based on a backlight portrait mode, the DSP 50 decreases an exposure level by one level, increases an exposure value according to a detected face, and softens edges by using an LPF. The DSP 50 processes third bracketed RAW data into an image corresponding to the portrait mode. When image processing is performed based on a portrait mode, in order to brighten RAW data, the DSP 50 increases an exposure value according to a detected face and softens edges by using an LPF.

When the bracketed images are completely processed, the DSP 50 stores and/or displays the processed images (operation 1470).

As described above, according to the present invention, a problem of misrecognition of a scene may be solved by displaying one or more scene modes detected from the same photographing environment and thus reliability may be provided to users.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine readable medium and/or computer readable medium.

While the present invention has been particularly shown and described with reference to exemplary embodiments thereof, it will be understood by one of ordinary skill in the art that various changes in form and details may be made therein without departing from the spirit and scope of the invention as defined by the following claims. The exemplary embodiments should be considered in a descriptive sense only and not for purposes of limitation. Therefore, the scope of the invention is defined not by the detailed description of the invention but by the following claims, and all differences within the scope will be construed as being included in the present invention.

What is claimed is:

1. An image processing apparatus comprising a digital signal processor (DSP) configured to select a plurality of scene modes applicable to a live-view image and configured to display the selected scene modes as icons on the live-view image,
   wherein the DSP is configured to perform a plurality of image processes on an image captured from the live-view image for the selected scene modes, and each of the image processes is performed by using one of multiple image processing techniques associated with each of the selected scene modes, and
   wherein the DSP is configured to evaluate multiple times the applicability of scene modes to the live-view image being updated in real time and for each evaluation determine whether the scene modes are applicable to the live-view image or not, and
   wherein the DSP is configured to select the predetermined number of scene modes based on a number of times each scene mode is evaluated to be applicable to the live-view image.

2. The image processing apparatus of claim 1, wherein the DSP is configured to choose one scene mode from among the selected scene modes and process the image captured from the live-view image using image processing techniques associated with the one scene mode.

3. The image processing apparatus of claim 1, wherein the DSP is configured to capture the image of the live-view image once for each of the selected scene modes using image capture settings associated with the corresponding scene mode and process each of the captured images using image processing techniques associated with the corresponding scene mode.

4. The image processing apparatus of claim 1, wherein the DSP comprises:
   a mode detection unit configured to determine the applicability of scene modes to the live-view image;
   a mode determination unit configured to select a predetermined number of scene modes based on the applicability of the scene modes to the live-view image; and
   a control unit configured to display the selected scene modes on the live-view image as the icons.

5. An image processing apparatus comprising a digital signal processor (DSP) configured to select a plurality of scene modes applicable to a live-view image, to display the selected scene modes on the live-view image, and to perform a plurality of image processes on an image captured from the live-view image for the selected scene modes,
   wherein each of the image processes is performed by using one of multiple image processing techniques associated with each of the selected scene modes, and
   wherein the DSP is configured to evaluate multiple times the applicability of scene modes to the live-view image being updated in real time and for each evaluation determine whether the scene modes are applicable to the live-view image or not, and
   wherein the DSP is configured to select the predetermined number of scene modes based on a number of times each scene mode is evaluated to be applicable to the live-view image.

6. The image processing apparatus of claim 5, wherein the DSP comprises:
   a mode detection unit configured to determine the applicability of scene modes to the live-view image;

a mode determination unit configured to select a predetermined number of scene modes based on the applicability of the scene modes to the live-view image;

an image processing unit configured to process the image captured from the live-view image using image processing techniques associated with a scene mode; and a control unit configured to display the selected scene modes on the live-view image as icons and control image processing on the captured image based on the image processing techniques associated with the displayed selected scene modes.

7. An image processing method comprising:

evaluating multiple times an applicability of a group of scene modes to a live-view image being updated in real time;

for each evaluation determining whether each scene mode of the group of scene modes is applicable to the live-view image or not;

selecting scene modes applicable to the live-view image based on a number of times each scene mode is evaluated to be applicable to the live-view image;

displaying the selected scene modes as icons on the live-view image; and performing a plurality of image processes on an image captured from the live-view image for the selected scene modes, wherein each of the image processes is performed by using one of multiple image processing techniques associated with each of the selected scene mode.

8. The image processing method of claim 7, further comprising:

choosing one scene mode from among the selected scene modes; and processing the image captured from the live-view image using image processing techniques associated with the one scene mode.

9. The image processing method of claim 7, further comprising:

capturing the image of the live-view image once for each of the selected scene modes using image capture settings associated with the corresponding scene mode; and processing each of the captured images using image processing techniques associated with the corresponding scene mode.

10. An image processing method comprising:

detecting a plurality of scene modes from a live-view image wherein detecting the plurality of scene modes comprises:

evaluating multiple times an applicability of a group of scene modes to the live-view image being updated in real time;

for each evaluation determining whether each scene mode of the group of scene modes is applicable to the live-view image or not; and selecting scene modes applicable to the live-view image based on a number of times each scene mode is evaluated to be applicable to the live-view image;

displaying the detected scene modes on the live-view image; and performing a plurality of image processes on an image captured from the live-view image for the displayed scene modes, wherein each of the image processes is performed by using one of multiple image processing techniques associated with each of the displayed scene modes.

* * * * *

UNITED STATES PATENT AND TRADEMARK OFFICE
CERTIFICATE OF CORRECTION

| | | |
|---|---|---|
| PATENT NO. | : 8,687,081 B2 | Page 1 of 1 |
| APPLICATION NO. | : 12/893049 | |
| DATED | : April 1, 2014 | |
| INVENTOR(S) | : Kwon | |

It is certified that error appears in the above-identified patent and that said Letters Patent is hereby corrected as shown below:

ON THE TITLE PAGE,

Item [73] Assignee, replace "Samsung Electrics Co., Ltd." with --Samsung Electronics Co., Ltd.--

Signed and Sealed this
Twenty-ninth Day of July, 2014

Michelle K. Lee
*Deputy Director of the United States Patent and Trademark Office*